(12) United States Patent
Shen et al.

(10) Patent No.: US 12,199,340 B2
(45) Date of Patent: Jan. 14, 2025

(54) TERMINAL DEVICE

(71) Applicant: Beijing Xiaomi Mobile Software Co., Ltd., Beijing (CN)

(72) Inventors: Daxuan Shen, Beijing (CN); Lulong Li, Beijing (CN); Yihui Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 128 days.

(21) Appl. No.: 18/070,880

(22) Filed: Nov. 29, 2022

(65) Prior Publication Data
US 2024/0055755 A1 Feb. 15, 2024

(30) Foreign Application Priority Data

Aug. 11, 2022 (CN) .......................... 202210964334.5

(51) Int. Cl.
*H01Q 1/44* (2006.01)
*H01Q 1/24* (2006.01)
(52) U.S. Cl.
CPC ............... *H01Q 1/44* (2013.01); *H01Q 1/243* (2013.01)
(58) Field of Classification Search
CPC .................................. H01Q 1/243; H01Q 1/44
See application file for complete search history.

(56) References Cited

U.S. PATENT DOCUMENTS

2015/0155614 A1  6/2015  Youn et al.
2020/0280131 A1* 9/2020  Avser .................. H01Q 21/061

FOREIGN PATENT DOCUMENTS

| CN | 111800529   | 10/2020 |
|----|-------------|---------|
| EP | 3832797 A1  | 6/2021  |
| GB | 2523367 A   | 8/2015  |

OTHER PUBLICATIONS

Extended European Search Report dated Aug. 14, 2023 for European Patent Application No. 22210583.5.

* cited by examiner

*Primary Examiner* — Graham P Smith
(74) *Attorney, Agent, or Firm* — Volpe Koenig (57) ABSTRACT

The disclosure relates to a terminal device. The terminal device includes a rear cover, a display screen, a first radiator and a second radiator, where the first radiator is arranged in the terminal device and faces the rear cover to radiate a first signal outwards through the rear cover, the second radiator is arranged in the terminal device and faces the display screen to radiate a second signal outwards through the display screen.

8 Claims, 8 Drawing Sheets

TERMINAL DEVICE

CROSS REFERENCE TO RELATED APPLICATIONS

The present application claims priority to Chinese Patent Application No. 202210964334.5, filed on Aug. 11, 2022. The entire contents of the above-listed application are hereby incorporated by reference for all purpose.

BACKGROUND

With development of the technology, experience requirements of users for terminal devices are increasingly high. Some terminal devices have poor signal reception and transmission capacities, which may be caused by design defects of antenna radiation directivity in the related art. For example, excellent signals can be obtained when the terminal devices are used in certain directions, and the signals are poor when the terminal devices are used in other directions, affecting use experience.

SUMMARY

The disclosure relates to the technical field of electronic devices, and in particular to a terminal device.

According to an example of the disclosure, a terminal device is provided. The terminal device includes a rear cover, a display screen, a first radiator and a second radiator, where the first radiator is arranged in the terminal device and faces the rear cover to radiate a first signal outwards through the rear cover, the second radiator is arranged in the terminal device and faces the display screen to radiate a second signal outwards through the display screen.

BRIEF DESCRIPTION OF THE DRAWINGS

The drawings here, which are incorporated in the description as a constituent part of the description, illustrate the examples satisfying the disclosure and are used to explain the principles of the disclosure together with the description.

DETAILED DESCRIPTION

The examples will be described in detail here and shown in, for example, the drawings. When the following descriptions relate to the drawings, unless otherwise specified, the same numeral in different drawings denotes the same or similar element. The examples described in the following examples do not denote all examples consistent with the disclosure. On the contrary, they are merely examples of an apparatus and a method consistent with some aspects of the disclosure as detailed in the appended claims.

In the absence of a contrary description, location words used, such as "up, down, left, right", are defined according to the direction indicated in the corresponding drawings, while "inside" and "outside" refer to the inside and outside of corresponding component's own contour. In addition, terms used in the disclosure, such as "first" and "second", are to distinguish one element from another, and do not have sequence and importance.

It is to be noted that all actions of obtaining signals, information or data in the disclosure are carried out on the premise of complying with corresponding data protection laws and policies of the country where the disclosure is located, and with the authorization of the corresponding apparatus owner.

Figure 1:
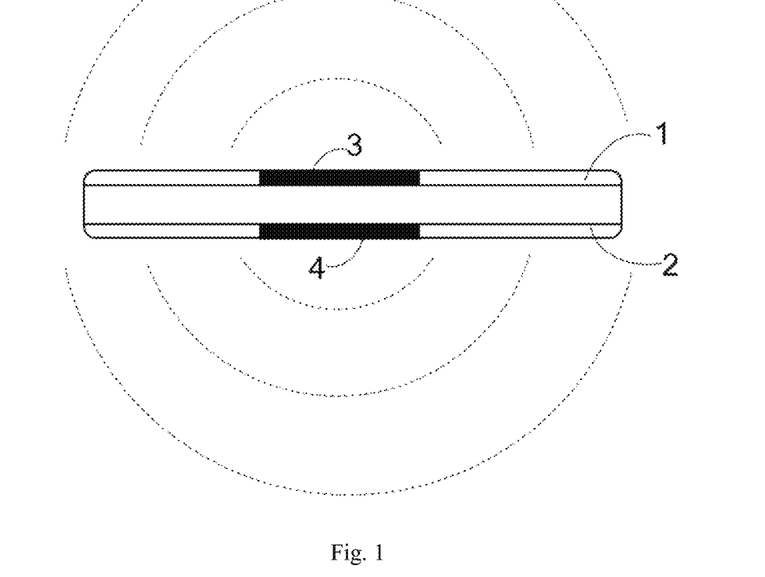
FIG. 1 is a schematic diagram of a terminal device according to an example.

The disclosure provides a terminal device. The terminal device includes, but not limited to, a mobile phone, a laptop and a tablet. As shown in FIG. 1, a terminal device of the disclosure includes a rear cover 1, a display screen 2, a first radiator 3 and a second radiator 4. The rear cover 1 may be used as part of a terminal shell. For example, the terminal shell includes the rear cover 1 and a frame arranged at a peripheral edge of the rear cover 1, and configure the terminal shell in a groove shape, thus accommodating electrical devices such as main board, etc. The display screen 2 is arranged on the other side opposite the rear cover 1. The first radiator 3 is arranged in the terminal device and faces the rear cover 1 to radiate a first signal outwards through the rear cover 1. The second radiator 4 is arranged in the terminal device and faces the display screen 2 to radiate a second signal outwards through the display screen 2. The first signal and the second signal here may be generated to cover the same working frequency band or to cover different working frequency bands.

Figure 7:
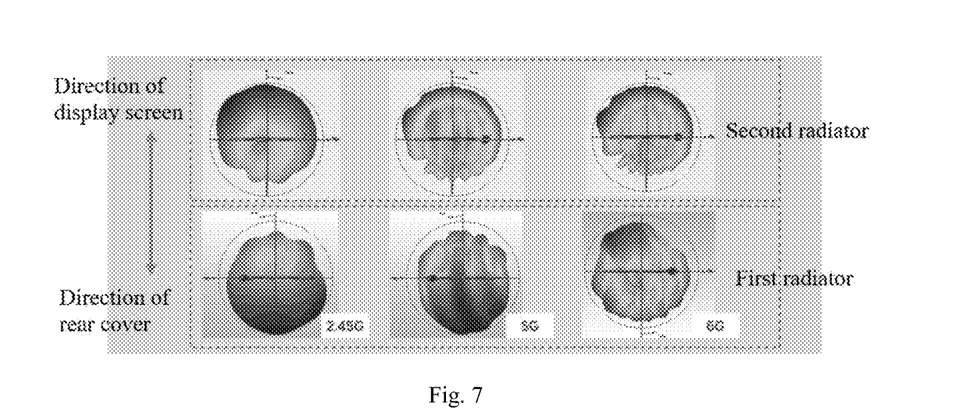
FIG. 7 is a radiation pattern of a radiator according to an example.

It is to be noted that above the first radiator 3 is used for radiating the first signal outwards through the rear cover 1 used to illustrate the directivity of radiation of the first radiator 3, also refer to FIG. 7, the darker shading in the figure represents the stronger radiation intensity, it may be observed that most of radiation signals of the first radiator 3 are radiated outwards through the rear cover 1, and a small amount of radiation signals are radiated outwards through the display screen 2, such that radiation intensity of the first radiator 3 in a direction towards the rear cover 1 is stronger than that in a direction towards the display screen 2, and signal reception and transmission effects are better. Similarly, the second radiator 4 is used for radiating the second signal outwards through the display screen 2, the radiation intensity of the second radiator 4 in the direction towards the display screen 2 is stronger than that in the direction towards the rear cover 1.

The technical solution provided in the example of the disclosure may include the following beneficial effects: the first radiator 3 is arranged on a side of the rear cover 1 and the second radiator 4 is arranged on a side of the display screen 2 of the terminal device, such that the disclosure could utilize radiation intensity of the first radiator 3 on the side of the rear cover 1 and radiation intensity of the second radiator 4 on the side of the display screen 2 respectively, that is, utilize complementarity of radiation intensity of the first radiator 3 and the second radiator 4 in respective radiation directions to provide dead-angle-free radiation for the terminal device in an omni-directional range, so as to improve use experience of a user. For example, when a user holds the terminal device with hand, whether the terminal device faces a signal source such as a router or faces away from the signal source, the problem of poor connection caused by poor received signals may not occur.

The material used by the rear cover 1 is not limited by the disclosure. In some examples, the rear cover 1 may be made of a non-metallic material, such as plastic as a whole, and the second radiator 4 can easily radiate the first signal directly outward through the rear cover 1 which made of a non-mental material. In another examples, the rear cover 1 may be made of a metal material. A metal terminal shell may improve the sense of technology and improve use strength. Since the metal material has a shielding effect on the radiator, in order to solve the problem, in the related art, a break joint is usually provided in the frame, and is filled with non-metal media such as resin. However, according to the mode of providing the break joint on the frame, on one hand, a process for forming the break joint on the frame has high difficulty and high cost, and on the other hand, the break joint is provided on the frame, such that the user usually uses the mode of holding the terminal device when using the terminal device, the break joint is easily shielded, and a radiation effect of the signals is weakened.

Figure 2:
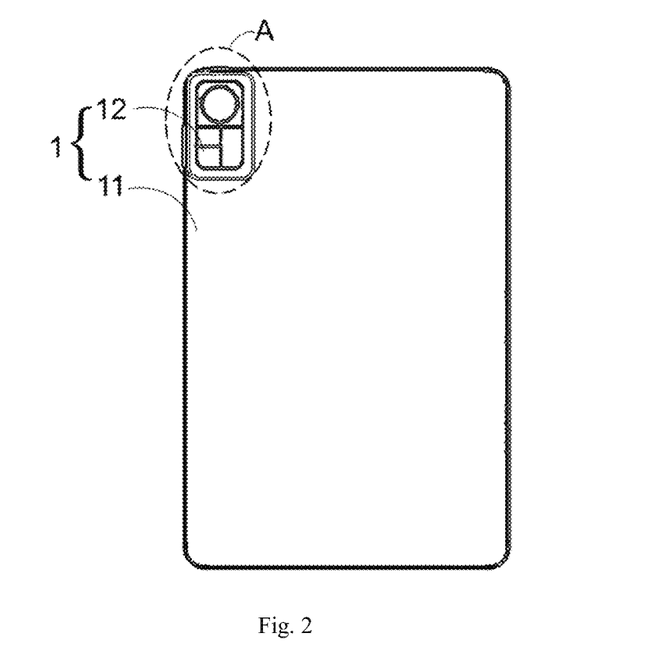
FIG. 2 is a rear view of a terminal device according to an example.
Figure 3:
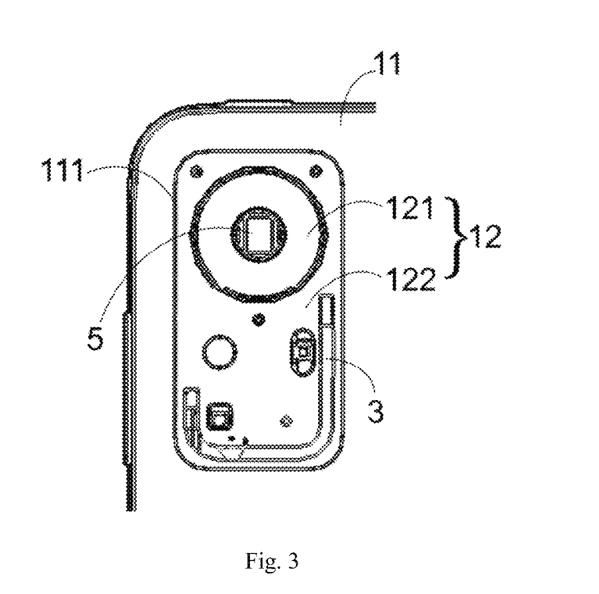
FIG. 3 is a partial enlarged view of the terminal device in FIG. 2 in an area A.

In order to solve the above technical problem, as shown in FIGS. 2 and 3, the rear cover 1 includes a metal cover body 11 and a non-metal decorative cover 12, where the cover body 11 uses an all-metal integrated forming process. An opening 111 is provided at a position of the cover body 11 corresponding to a camera module 5, the decorative cover 12 is used for covering the opening 111, and the first radiator 3 being arranged at a position corresponds to the decorative cover 12 that is, the decorative cover 121 is configured to cover the camera module 5 and the first radiator 3 at the same time to radiate the first signal outwards through the decorative cover 12.

In fact, the first radiator 3 having the above configuration may be regarded as a kind of slot antenna. Different from the mode of providing the break joint on the frame in the prior art, the opening 111 provided on the cover body 11 serves as the break joint in the disclosure. The decorative cover 12 serves as a non-metal medium for filling the break joint. The decorative cover 12 covers the camera module 5 to ensure integrity of the rear cover 1 in appearance, and may present design patterns satisfying different experiences as required without presenting obviously inharmonious break joints as in the prior art. In addition, the first radiator 3 radiates signals outwards through the rear cover 1, particularly through the decorative cover 12, instead of radiating signals outwards through the break joint arranged on the frame in the prior art, and it is difficult to cover the decorative cover 12 when the user holds the terminal device, such that the problem of shielding the signals is not easy to occur.

With reference to FIG. 3, the decorative cover 12 may be configured to include a light-permeable portion 121 and a shielding portion 122. It may be understood that the shielding portion 122 is any other area on the decorative cover 12 than the light-permeable portion 121. The light-permeable portion 121 covers at least a light photosensitive portion of the camera module 5, such that light may be input into the light photosensitive portion. The decorative cover 12 may be integrally formed. The light-permeable portion 121 may be made of a transparent material, and the shielding portion 122 may be made of a non-transparent material, thus shielding wiring inside the terminal device that is not intended to radiate or receive electromagnetic radiation. The first radiator 3 being arranged at a position corresponds to the shielding portion 122, that is the shielding portion 122 is configured to cover at least the first radiator 3, and is used for radiating the first signal of the first radiator 3 outwards through the shielding portion 122.

In some examples, as shown in FIGS. 6a to 6e, the first radiator 3 includes a first feed branch 31, a second feed branch 32 and a feed point F, where the first feed branch 31 and the second feed branch 32 extend from a position of the feed point to two sides respectively. The first feed branch 31 and the second feed branch 32 may resonate in different frequency bands. For example, the objective of resonating in different frequency bands may be achieved by changing a length, width, or shape of the feed branch.

According to different extension directions of the first feed branch 31 and the second feed branch 32 away from two sides of the feed point F, the first radiator 3 may be constructed into one of an I-shape, an L-shape, a U-shape or a J-shape, and the specific shape may be selected according to required working frequency bands. For example, in the I-shape, the first feed branch 31 and the second feed branch 32 extends linearly from the feed point F in an opposite direction respectively. For another example, in the L-shape, the second feed branch 32 extends linearly, and the first feed branch 31 extends linearly and then horizontally.

Figure 8:
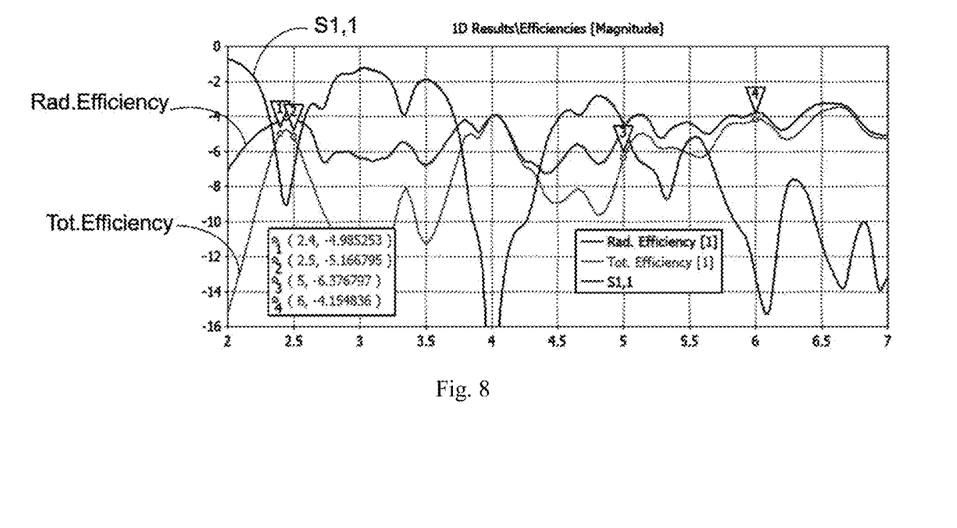
FIGS. 8 and 9 are schematic diagrams of performance simulation of a first radiator according to an example.
Figure 9:
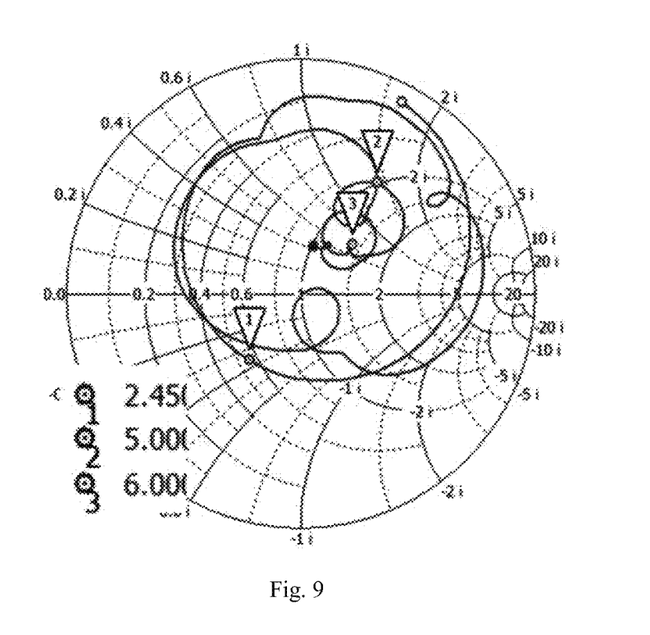

In some examples, with reference to FIGS. 6a to 6e, the first feed branch 31 and the second feed branch 32 are integrally formed, and the first radiator 3 has an extension length ranging from 55 mm to 65 mm from a first end to a second end, that is, a total length of the first feed branch 31 and the second feed branch 32 in an extension direction ranges from 55 mm to 65 mm. From the first end or the second end of the first radiator 3, for example, from the first feed branch 31 to one end away from the feed point F shown in FIGS. 6a to 6e, the feed point F is arranged at a ⅓ position in a length direction of the first radiator 3, and even if a matching circuit is not added, enough resonant frequency and bandwidth may be covered. As shown in diagrams of performance simulation of FIGS. 8 and 9, the first radiator 3 may cover a frequency band of wireless fidelity WIFI 2.4G WIFI 5G and WIFI 6G.

Figure 4:
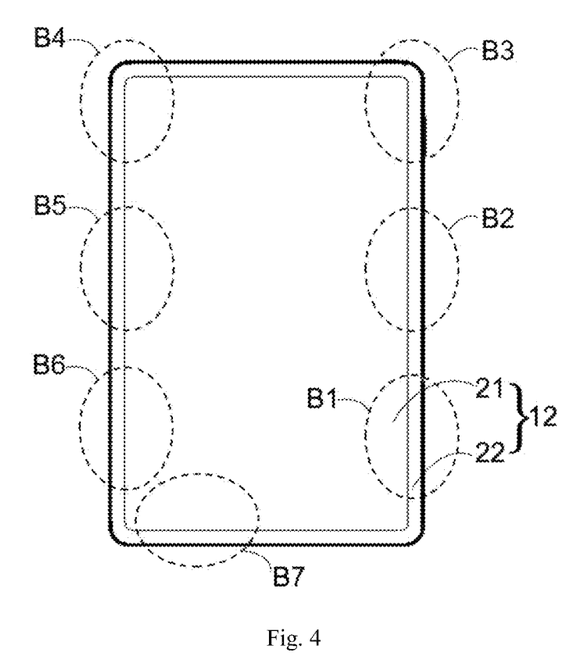
FIG. 4 is a front view of a terminal device according to an example.
Figure 5:
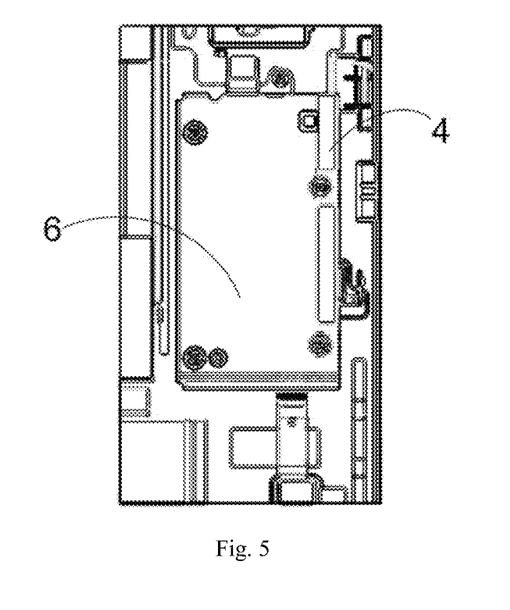
FIG. 5 is a partial internal enlarged view of the terminal device in FIG. 4 in an area B1.
Figure 6A:
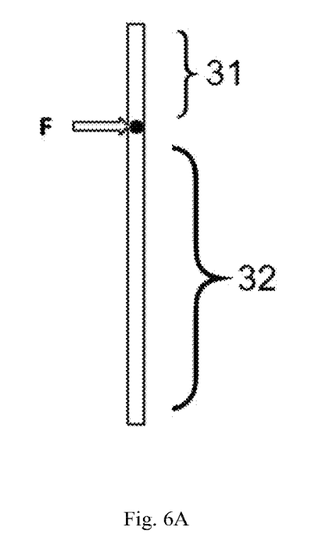
FIGS. 6a-6e are schematic diagrams of a first radiator according to an example.
Figure 6B:
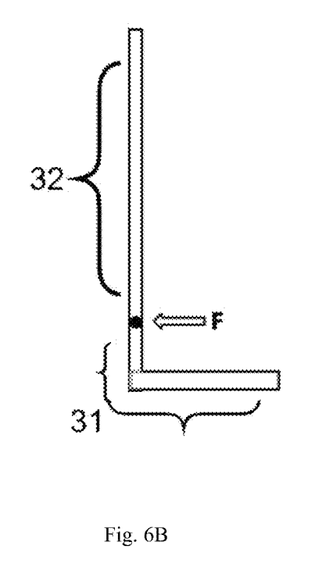
Figure 6C:
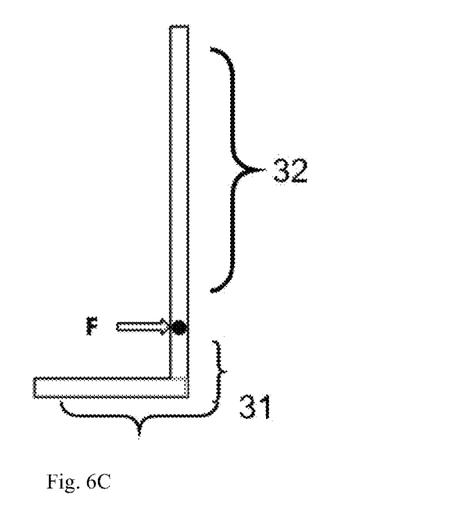
Figure 6D:
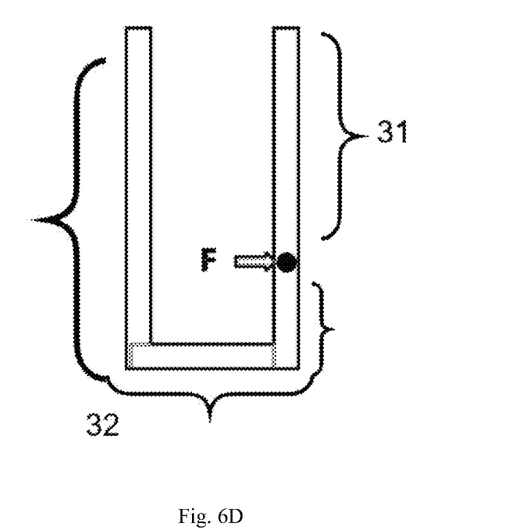
Figure 6E:
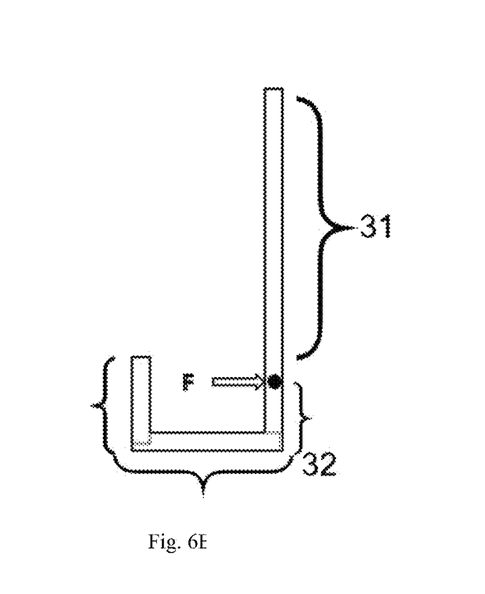
Figure 10:
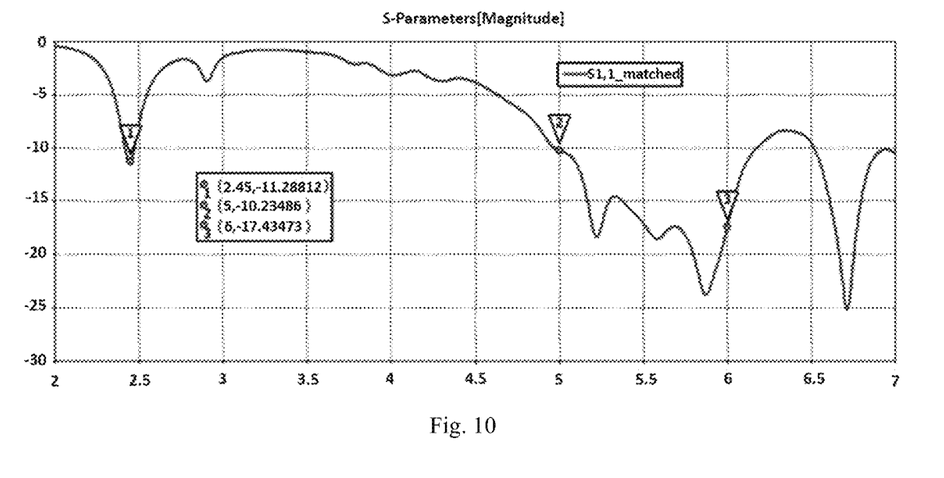
FIGS. 10 and 11 are schematic diagrams of performance simulation of a second radiator according to an example.
Figure 11:
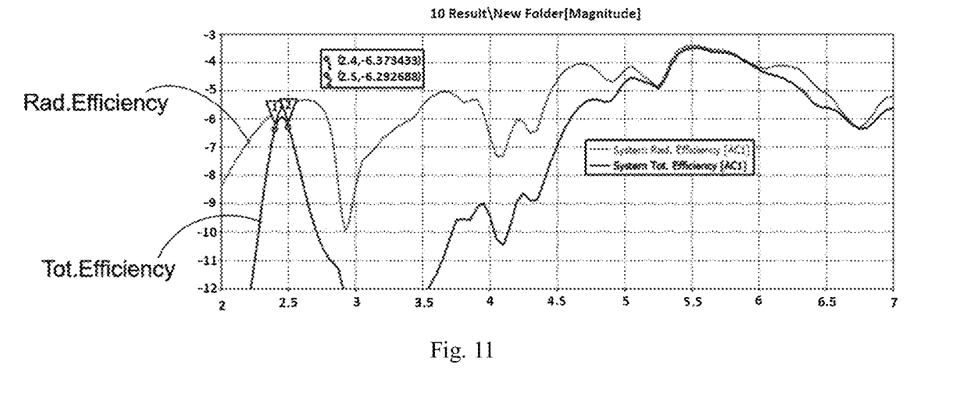

The display screen 2 usually includes a metal architecture, such that the display screen 2 may also generate a shielding effect on the radiator. In the example of the disclosure, as shown in FIGS. 4 and 5, the display screen 2 includes a display area 21, and a non-display area 22 extending around a periphery of the display area 21, and the non-display area 21 being made of a non-metal material. A shielding cavity for accommodating the second radiator 4 is formed in the terminal device and provided with an outlet towards the non-display area 22. That is, the second radiator 4 may be regarded as a kind of cavity antenna. Visually, the shielding cavity is similar to a box having no cover, and the second signal radiated by the second radiator 4 is shielded in the box by a side wall of the box, such that the second signal may merely be radiated outwards from the outlet, and a direction of outward radiation of the second radiator 4 may be guided by the orientation of the outlet. Specifically, the disclosure provides the outlet towards the non-display area 22, so as to make the second radiator 4 radiate the second signal outwards through the non-display area 22. As shown in FIG. 4, the second radiator 4 is optionally arranged in any of areas B1-B7. For example, as shown in diagrams of performance simulation of FIGS. 10 and 11, a working frequency band of the second radiator 4 covers WIFI 2.4 WIFI 5G and WIFI 6G.

The disclosure does not limit formation of the shielding cavity. In some examples, the display screen 2 may be used as a part of the shielding cavity, and in this case, the display screen 2 is grounded, and the shielding cavity is enclosed by the display screen 2 and the metal terminal housing. In another examples, as shown in FIG. 5, a metal supporting part 6 used for supporting the second radiator 4 is arranged in the terminal device. The supporting part 6 is grounded to form the shielding cavity having the outlet towards the non-display area 22. That is, the shielding cavity is enclosed by the metal supporting part 6 and the metal terminal shell, and in this case, the display screen 2 is not used as a part of the shielding cavity, such that the second radiator 4 does not need to be attached to the display screen 2, and the situation that the display screen 2 presents the defect of water waves since the display screen 2 is pressed by the second radiator 4 may be avoided.

Lengths of the first radiator 3 and the second radiator 4 of the disclosure are configured to correspond to a basic mode, and the first radiator 3 and the second radiator 4 are configured to excite a high-order mode. The basic mode refers to an antenna action in which resonance is carried out at a basic frequency, and the high-order mode refers to an antenna action in which resonance is carried out at a frequency higher than the basic frequency. When the radiator is designed, the radiator may be designed into a proper basic mode, and then the radiator is adjusted to a required working frequency band by means of caliber tuning, matching tuning, etc. For example, the resonance corresponding to the basic mode is a low frequency band, and after matching tuning, the resonance of the basic mode may cover a medium-high frequency band. By means of such a mode, the radiator having a single length may cover more working frequency bands. For example, for aperture tuning function can be realized by setting the aperture tuning port and opening the same for adjustment, and for the matching tuning function can be realized by setting a matching tuning circuit. The matching tuning circuit is electrically connected to the feed port, and the mode of the radiator is adjusted by adjusting components such as resistors and capacitors in the matching tuning circuit.

Those skilled in the art could easily conceive of other implementation solutions of the disclosure upon consideration of the description and the disclosure in the implementation. The disclosure is intended to cover any variations, uses or adaptive changes of the disclosure, which follow the general principles of the disclosure and include common general knowledge or customary technical means, which is not disclosed in the disclosure, in the technical field. The description and the examples are to be regarded as exemplary merely, and the true scope and spirit of the disclosure are indicated by the following appended claims.

It is to be understood that the disclosure is not limited to a precise structure which has been described above and illustrated in the drawings, and may have various modifications and changes without departing from the its scope. The scope of the disclosure is solely limited by the appended claims.

What is claimed is:

1. A terminal device, comprising a rear cover, a display screen, a first radiator and a second radiator, wherein the first radiator is arranged in the terminal device and faces the rear cover to radiate a first signal outwards through the rear cover, the second radiator is arranged in the terminal device and faces the display screen to radiate a second signal outwards through the display screen, the display screen comprises a display area, and a non-display area extending around a periphery of the display area, the non-display area being made of a non-metal material, a metal supporting part is arranged in the terminal device for supporting the second radiator, the supporting part is grounded and forms a shielding cavity having the outlet towards the non-display area.

2. The terminal device according to claim 1, wherein the rear cover comprises a metal cover body and a non-metal decorative cover, an opening being provided at a position of the cover body corresponding to a camera module, the decorative cover being used for covering the opening, and the first radiator being arranged at a position corresponding to the decorative cover to radiate the first signal outwards through the decorative cover.

3. The terminal device according to claim 2, wherein the decorative cover comprises a light-permeable portion and a shielding portion, the light-permeable portion at least covering a light photosensitive portion of the camera module, and the first radiator being arranged at a position corresponding to the shielding portion.

4. The terminal device according to claim 1, wherein the first radiator comprises a first feed branch, a second feed branch and a feed point, the first feed branch and the second feed branch extending from a position of the feed point to two sides respectively.

5. The terminal device according to claim 4, wherein the first radiator is configured in one of an I-shape, an L-shape, a U-shape, or a J-shape.

6. The terminal device according to claim 4, wherein the first feed branch and the second feed branch are integrally formed, and the first radiator has an extension length ranging from 55 mm to 65 mm from a first end to a second end; and from the first end or the second end of the first radiator, the feed point is arranged at a ⅓ position in a length direction of the first radiator.

7. The terminal device according to claim 1, wherein a length of the first radiator and a length of the second radiator are configured to correspond to a basic mode, and the first radiator and the second radiator are configured to excite a high-order mode.

8. The terminal device according to claim 1, wherein at least one of the first radiator and the second radiator has a working frequency band of wireless fidelity comprising at least one of WIFI 2.4G and WIFI 5G.

* * * * *

UNITED STATES PATENT AND TRADEMARK OFFICE
CERTIFICATE OF CORRECTION

PATENT NO. : 12,199,340 B2  
APPLICATION NO. : 18/070880  
DATED : January 14, 2025  
INVENTOR(S) : Shen et al.

It is certified that error appears in the above-identified patent and that said Letters Patent is hereby corrected as shown below:

In the Specification

In Column 3, Line 9, delete "which made" and insert -- which is made --, therefor.

In Column 3, Line 10, delete "another examples," and insert -- another example, --, therefor.

In Column 3, Line 31, delete "corresponds" and insert -- corresponding --, therefor.

In Column 3, Line 64, delete "corresponds" and insert -- corresponding --, therefor.

In Column 4, Line 20, delete "extends" and insert -- extend --, therefor.

In Column 4, Line 38, delete "WIFI 2.4G" and insert -- WIFI 2.4G, --, therefor.

In Column 4, Line 63, delete "WIFI 2.4 WIFI 5G" and insert -- WIFI 2.4G, WIFI 5G, --, therefor.

In Column 5, Line 3, delete "another examples," and insert -- another example, --, therefor.

In Column 5, Line 53, delete "the its" and insert -- its --, therefor.

Signed and Sealed this  
Eighteenth Day of March, 2025

Coke Morgan Stewart  
*Acting Director of the United States Patent and Trademark Office*